Nov. 12, 1974     M. W. MACHET     3,848,046
METHOD OF MANUFACTURING A SIMULATED STAINED GLASS ARTICLE
Filed July 26, 1972
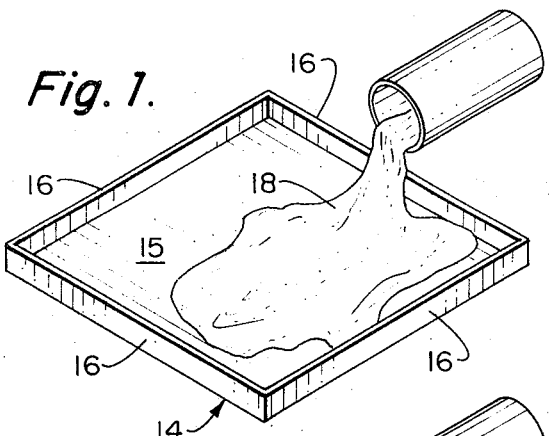
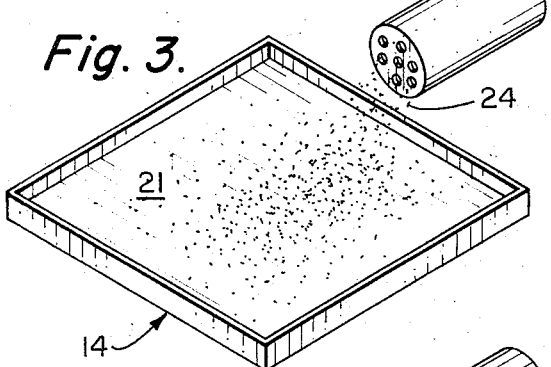
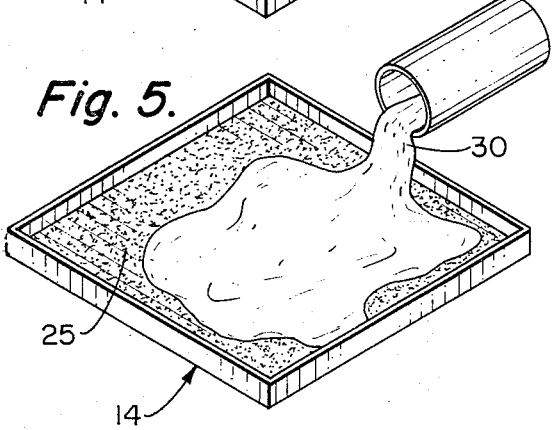
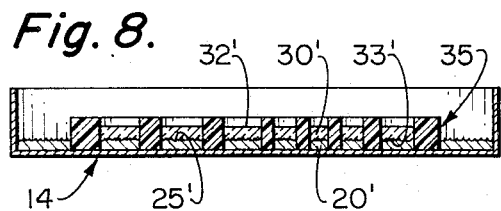
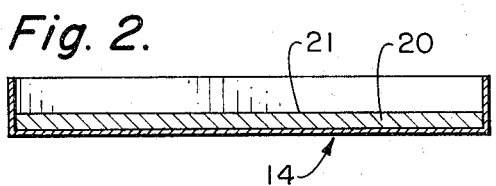
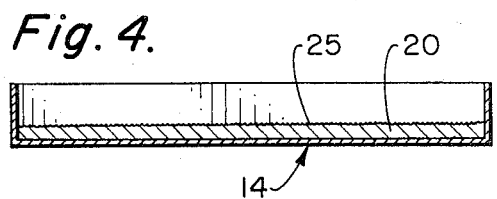
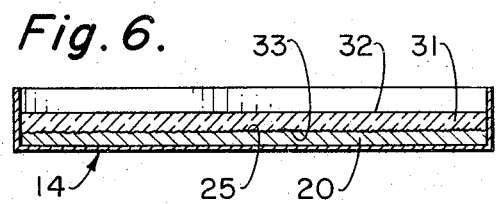
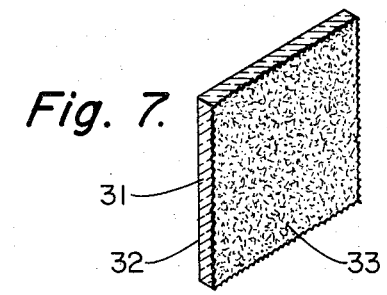
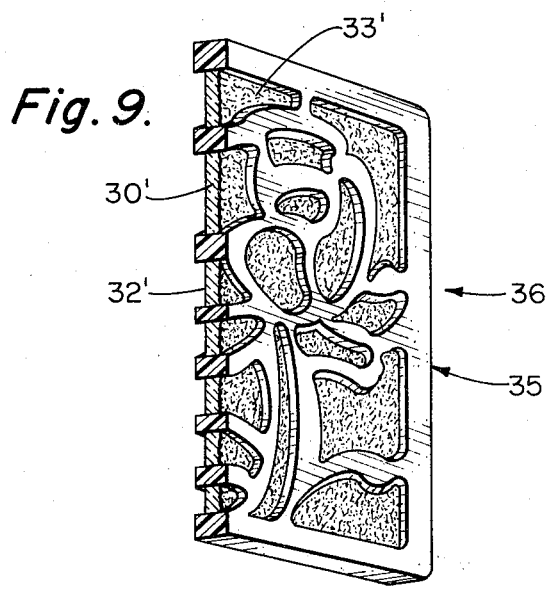

United States Patent Office 3,848,046
Patented Nov. 12, 1974

3,848,046
METHOD OF MANUFACTURING A SIMULATED STAINED GLASS ARTICLE
Michael W. Machet, 3717 Mariana Way,
Santa Barbara, Calif. 93105
Filed July 26, 1972, Ser. No. 275,251
Int. Cl. B29c 9/00
U.S. Cl. 264—279                               8 Claims

ABSTRACT OF THE DISCLOSURE

A simulated stain glass article and method of manufacture, the article having a textured surface resulting from first placing a thin layer of a gel substance in a mold and thereafter sprinkling an absorbent on the gel surface causing the gel surface to coagulate into an irregular nodular surface texture, and pouring a glass simulating plastic material over said textured surface and allowing the plastic material to become rigid and removing the gel material from the plastic material leaving the impression of the textured surface on the plastic material.

BACKGROUND OF THE INVENTION

The manufacture of textured glass has been accomplished for many years and requires master craftsmen and sophisticated equipment. Glass makers heat a combination of silica sand and other material to a molten state and roll this molten substance into flat panels or sheets that can be cut and used for decorative purposes such as stained glass windows and decorative lamps. The manufacture of textured stained glass is very precise and by the nature of the manufacturing techniques extremely difficult without a very large investment in equipment and trained personnel.

A method of producing a simulated leaded stained glass article is described in Applicant's co-pending U.S. application Ser. No. 193,967 filed Oct. 29, 1971, now abandoned. The simulated leaded stained glass is produced by partially immersing an edge of a framework into a thin layer of gel substance which has been permitted to harden in a mold. Thereafter, a glass simulating plastic material is poured into the individual cavities of the framework and permitted to harden. Various colors of plastic material can be utilized in different frame cavities to provide a decorative appearance to the stained glass frame. After the plastic material hardens and attaches to the framework, the framework and gel substance are removed from the mold and the gel is removed from the plastic material. Thereafter, the two surfaces of the glass simulating plastic material have a glazed, shiny appearance.

SUMMARY OF THE INVENTION

The method of the present invention provides for the achievement of a texture mold surface on one side of the simulated stain glass. The present method is similar to that previously described in that a gel substance, such as gelatin, is first poured into a mold and allowed to harden. Thereafter an edge of a framework can be partially emerged in the thin layer of gel substance, if the finished article is to include a frame. After the gel has solidified, an absorbent is sprinkled on the gel surface and reacts with the gel surface causing the surface to coagulate in an irregular manner into a nodular surface texture. The absorbent can consist of a dry powdered gelatin similar to that used to produce the gel layer and the courseness of the final surface texture will depend on the amount of absorbent used. After the textured surface has been prepared, a layer of normally rigid glass material, such as plastic, is poured onto the surface and permitted to harden so that the impression of the textured gel surface is imparted to one surface of the plastic material. The plastic material is then removed from the mold and the gel is then removed from the plastic material leaving the impression of the textured surface as a decorative feature of the simulated stained glass article.

The product of the present invention aesthetically reproduces many of the qualities of textured stained glass but at a lower cost. The simulated stained glass is fabricated from a suitable plastic material to reproduce not only the striated, transparent and opaque color, but also the textured surface qualities of actual glass.

BRIEF DESCRIPTION OF THE DRAWINGS

FIG. 1 is a perspective view of an empty mold frame to which a thin layer of liquid gel substance is being poured;

FIG. 2 is a vertical section along line 2—2 of FIG. 1 showing the smooth thin gel layer after hardening;

FIG. 3 is a perspective view of the mold containing the gel layer onto which is being sprinkled an absorbent to coagulate the surface of the gel in a textured manner;

FIG. 4 is a vertical section along line 4—4 of FIG. 3 showing the resulting textured surface on the gel layer;

FIG. 5 is a perspective view of the mold and the textured surface of the gel layer onto which is being poured a plastic material which hardens to simulate glass;

FIG. 6 is a vertical section along line 6—6 of FIG. 5 showing the textured surface on the bottom of the rigid plastic material conforming to the textured surface of the gel layer.

FIG. 7 is a perspective view of the simulated stained glass article removed from the mold and the gel layer removed to leave the simulated textured glass surface;

FIG. 8 is a modification showing a framework having an edge partially immersed in a thin gel layer which has been textured; and FIG. 9 is a section along line 8—8 FIG. 8 showing the final structure of the framework containing the textured surface simulated stained glass.

DETAILED DESCRIPTION OF THE INVENTION

As illustrated in FIG. 1, mold 14 is in the form of a box having a bottom 15 and sides 16 defining an open top. It is understood that the mold can be of any desired shape other than as illustrated to produce a textured sained glass article of desired shape. A gel substance 18 in an aqueous liquid form is poured onto the bottom mold surface 15 to form a uniform gel layer 20 having the desired thickness (see FIG. 2). The gel substance can be standard, clear gelatin or other material which forms a similar layer.

Before the gel hardens in the mold it is uniformly sprinkled with an absorbent material 24 in powdered or granular form, as illustrated in FIG. 3. The absorbent material can be any suitable material which will absorb moisture from the gel surface 21 of the gel layer and cause it to coagulate in an irregular manner with a nodular surface texture. One suitable absorbent is powdered gelatin in dry form, similar to that used to produce the liquid gelatin 18 poured into the mold to produce layer 20. The more powder sprinkled on the surface 21 the more irregular and coarse the texture of surface 21 will become. The resulting textured surface 25 of the layer 20 is illustrated in FIG. 4 and it is pointed out that there are no granular particles on the surface since the powder absorbs the liquid from the gel surface and swells and merges into the gel surface while causing shrinkage of the surface.

After the gel substance and textured surface 25 have hardened, a glass simulating material 30 is poured onto the textured surface, as illustrated in FIG. 5, to produce a textured stained glass article 31 of desired thickness (see FIG. 6) The simulating material is preferably a polyester resin which can be prepared in liquid form and a catalyst added to cause the plastic to harden after pouring onto the textured surface 25. It is understood that the plastic can be colored with a commercial dye to produce any desired aesthetic effect for the article. The liquid polyester will form a uniform outer surface 32 upon hardening which has a glassy appearance. During hardening, the under surface 33 of the article 31 will assume an irregular texture surface 33 which is the reverse of gel surface 25.

The last step in producing the article 31 is to remove it from the mold 14 along with the gel substance attached to it and the gel substance is then removed in any suitable manner, such as by washing off with hot water. The completed article 31 is illustrated in FIG. 7 can then be sprayed on with a clear gloss coating to enhance its appearance and provide surface protection.

The finished product simulates the aesthetic appearance of actual textured stained glass because it has the same surface qualities as well as the same dimensional qualities. The method of the present invention is adaptable to automatic and other mass production techniques so that the resulting product is inexpensive to produce. It is understood that the thickness of the gel layer after being treated with the absorbent is sufficient to protect the plastic material from contact with the bottom of the mold. Also, the thickness of the plastic material 30 can be varied depending on the amount of material poured in the mold in order to vary the thickness of article 31.

In FIG. 8, there is illustrated a framework 35 of hard plastic material which has been set into gel layer 20' in an edgewise fashion after absorbent 24 has been sprinkled on the layer to form the irregular surface 25'. Thereafter, a layer of plastic material 30 has been introduced into and hardened in each of the cavities within the framework 35. During hardening of the plastic material, it will attach to the mold edges surrounding the cavities and will conform with the textured surface 25' of the layer 20' as illustrated in FIG. 8. The framework is then removed from the mold 14 and the gel layer 20 is removed from the plastic by any suitable process, such as by washing off with hot water.

FIG. 9 illustrates the completed simulated, textured stained glass article 36 consisting of framework 35 with the plastic portions in the cavities having a textured surface 33' on one side and a plain glassy surface 32' on the opposite side. It will be understood there will be a relief of the edge of the framework on the textured side corresponding to the thickness of the gel layer 20' and that the amount of plastic material 30' poured into the cavities will determine the amount of relief, if any, which will exist between the glassy surface 32' and the opposite edge of the framework. The color of the plastics in the various cavities can be selected to produce the desired aesthetic appearance of the simulated textured article 36 and the framework 35 can be of various sizes and shapes for the production of desired articles. It is therefore apparent that the subject of the present invention is applicable to a wide variety of articles; excluding solid and framed articles.

What is claimed is:

1. A method of manufacturing a simulated textured stained glass article comprising the steps of:
    pouring a liquid, water soluble gel substance into a mold to form a thin gel layer on the bottom of the mold,
    sprinkling a dry powdered, liquid soluble absorbent onto the top surface of the gel substance before the substance gels to produce a textured surface on said gel layer as it hardens;
    permitting water from said top surface of said gel layer to be absorbed by said absorbent while said layer hardens to cause said absorbent to swell and merge into the gel surface and produce an irregular textured surface on said gel layer;
    pouring a glass simulating plastic material in liquid form onto said textured surface after hardening of said gel layer and allowing said material to harden while receiving the impression of said textured surface on one side; and
    removing said hardened gel substance from said plastic material by dissolving such in water to produce the finished article.

2. A method as defined in Claim 1 wherein: said gel substance comprises gelatin.

3. A method as defined in Claim 1 wherein: said plastic material comprises polyester.

4. A method as defined in Claim 1 wherein: said absorbent comprises powdered gelatin.

5. A method as defined in Claim 1 wherein: said gel substance is removed from said plastic material by washing with hot water.

6. A method as defined in Claim 1 wherein said absorbent comprises powdered gelatin and said gel substance comprises gelatin.

7. The method of manufacturing a simulated textured stained glass article as defined in Claim 1 wherein after the first pouring step:
    placing a frame for said article into said mold and permitting said frame to sink to the bottom of said mold.

8. The method of manufacturing a simulated textured stained glass article as defined in Claim 7 wherein after the second pouring step:
    removing said frame and said hardened material from said mold.

References Cited

UNITED STATES PATENTS

| | | | |
|---|---|---|---|
| 3,365,524 | 1/1968 | Thompson et al. | 264—226 |
| 3,499,070 | 3/1970 | Jackson | 264—333 |

ROBERT F. WHITE, Primary Examiner

T. E. BALHOFF, Assistant Examiner

U.S. Cl. X.R.
264—246, 317